US009507787B1

United States Patent
Bono et al.

(10) Patent No.: US 9,507,787 B1
(45) Date of Patent: Nov. 29, 2016

(54) PROVIDING MOBILITY TO VIRTUAL STORAGE PROCESSORS

(71) Applicant: EMC Corporation, Hopkinton, MA (US)

(72) Inventors: Jean-Pierre Bono, Westborough, MA (US); Frederic Corniquet, Le Pecq (FR); Miles A. de Forest, Bahama, NC (US); Himabindu Tummala, South Grafton, MA (US); Walter C. Forrester, Berkeley Heights, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 243 days.

(21) Appl. No.: 13/837,053

(22) Filed: Mar. 15, 2013

(51) Int. Cl.
G06F 17/30 (2006.01)
(52) U.S. Cl.
CPC ............... *G06F 17/30091* (2013.01)
(58) Field of Classification Search
CPC ............ G06Q 30/06; G06F 17/30041; G06F 17/30044
USPC ........................ 707/619, 647, 627
See application file for complete search history.

(56) References Cited

U.S. PATENT DOCUMENTS

| 7,383,463 | B2 | 6/2008 | Hayden et al. |
| 7,631,155 | B1 | 12/2009 | Bono et al. |
| 7,769,722 | B1 | 8/2010 | Bergant et al. |
| 8,006,056 | B2 * | 8/2011 | Voigt et al. ............ 711/165 |
| 2004/0030668 | A1 | 2/2004 | Pawlowski et al. |
| 2007/0050415 | A1 * | 3/2007 | Armangau et al. ........... 707/200 |
| 2007/0073782 | A1 * | 3/2007 | Nakatani et al. ............. 707/200 |
| 2010/0082934 | A1 * | 4/2010 | Naganuma et al. .......... 711/170 |
| 2013/0198459 | A1 * | 8/2013 | Joshi ..................... G06F 12/084 711/130 |

OTHER PUBLICATIONS

Using VNX Replicator, ECM Corporation, Copyright 1998-2012, Published Jan. 2012, 220 pages.*
Bono, "Unified Datapath Architecture," U.S. Appl. No. 13/828,322, filed Mar. 14, 2013.
Bono, et al., "Unified Datapath Processing With Virtualized Storage Processors," U.S. Appl. No. 13/828,294, filed Mar. 14, 2013.

(Continued)

*Primary Examiner* — Scott A Waldron
*Assistant Examiner* — Loc Tran
(74) *Attorney, Agent, or Firm* — BainwoodHuang

(57) ABSTRACT

A technique provides mobility to VSPs. The technique involves receiving, by processing circuitry, a VSP move command from a user. The VSP move command specifies a source VSP and a destination. The technique further involves identifying, by the processing circuitry and in response to the VSP move command, multiple source data objects which are configured to store data from the context of the source VSP. The multiple source data objects reside in a source storage pool. The technique further involves, after the multiple source data objects are identified, transforming the multiple source data objects into multiple destination data objects which are configured to store data from the context of a destination VSP at the destination. The multiple destination data objects reside in a destination storage pool which is different from the source storage pool. Such operation effectively provides VSP migration from source to destination.

24 Claims, 10 Drawing Sheets

(56) References Cited

OTHER PUBLICATIONS

Bono, et al., et al., "Automatically Creating Multiple Replication Sessions in Response to a Single Replication Command Entered by a User," U.S. Appl. No. 13/837,825, filed Mar. 15, 2013.

Bono, et al., "Virtual Storage Processor Failover," U.S. Appl. No. 13/838,540, filed Mar. 15, 2013.

Bono, et al., "Unified Data Protection for Block and File Objects," U.S. Appl. No. 13/853,508, filed Mar. 29, 2013.

Bono, et al., "Preserving Quality of Service When Replicating Data Objects," U.S. Appl. No. 14/576,939, filed Dec. 19, 2014.

Configuring NFS on VNX Series, EMC® VNX Series, Release 7.1, EMC Corporation, 1998, 150 pages.

EMC Corporation, "Using EMC Celerra Replicator," Feb. 2009.

EMC Corporation, "EMC Celerra Replicator," (http://chucksblog.emc.com/content/CelerraReplicator.pdf) 2008.

EMC Corporation, "EMC RecoverPoint Family," (http://www.emc.com/collateral/software/data-sheet/h2769-recoverpoint-ds.pdf) Aug. 2013.

EMC Corporation, "EMC Business Continuity and Disaster Recovery Solutions," (https://enterpriseportalcontent.mci.com/NR/rdonlyres/7A037904-A72F-4C79-BC21-4731442BFD9A/0/SoCDREventEMCReplicationRW.pdf) 2008.

EMC Corporation, "Array-Based Replication with EMC VPLEX," (http://www.emc.com/collateral/hardware/white-papers/h8005-array-based-replication-vplex-wp.pdf) Aug. 2010.

EMC Corporation, "Configuring Virtual Data Movers on VNX," (http://corpusweb130.emc.com/upd_prod_VNX/UPDFinalPDF/jp/VDMs.pdf) Feb. 2011.

"EMC VNX and Virtual Data Mover (VDM) Replication", EMC Corporation, YouTube Video, http://www.youtube.com/watch?v=07ng6268vk1, uploaded on Sep. 9, 2011.

"Using EMC® Celerra Replicator (V2), "Cierra Network Server, Technical Module, Feb. 2009, 184 pages.

"VNX Video: Virtual Data Mover (VDM) on the VNX," EMC Corporation, YouTube Video, http://www.youtube.com/watch?v=o7ng6268vkl, uploaded on Aug. 11, 2011.

Bono, et al., "Virtual Storage Processor Load Balancing," U.S. Appl. No. 13/837,086, filed Mar. 15, 2013.

Bono, et al., "Providing Mobility to Virtual Storage Processors," U.S. Appl. No. 13/837,053, filed Mar. 15, 2013.

Bono, et al., "Providing Multi-Tenancy Within a Data Storage Apparatus," U.S. Appl. No. 13/837,869, filed Mar. 15, 2013.

Bono, et al., "Leveraging Array Operations at Virtualized Storage Processor Level," U.S. Appl. No. 13/928,610, filed Jun. 27, 2013.

Bono, et al., "Synchronous Replication of Virtualized Storage Processors," U.S. Appl. No. 14/041,191, filed Sep. 30, 2013.

Bono, et al., "Metro-Cluster Based on Synchronous Replication of Virtualized Storage Processors," U.S. Appl. No. 14/041,204, filed Sep. 30, 2013.

Bono, et al., "Providing Virtual Storage Processor (VSP) Mobility With Induced File System Format Migration," U.S. Appl. No. 14/041,097 filed Sep. 30, 2013.

* cited by examiner

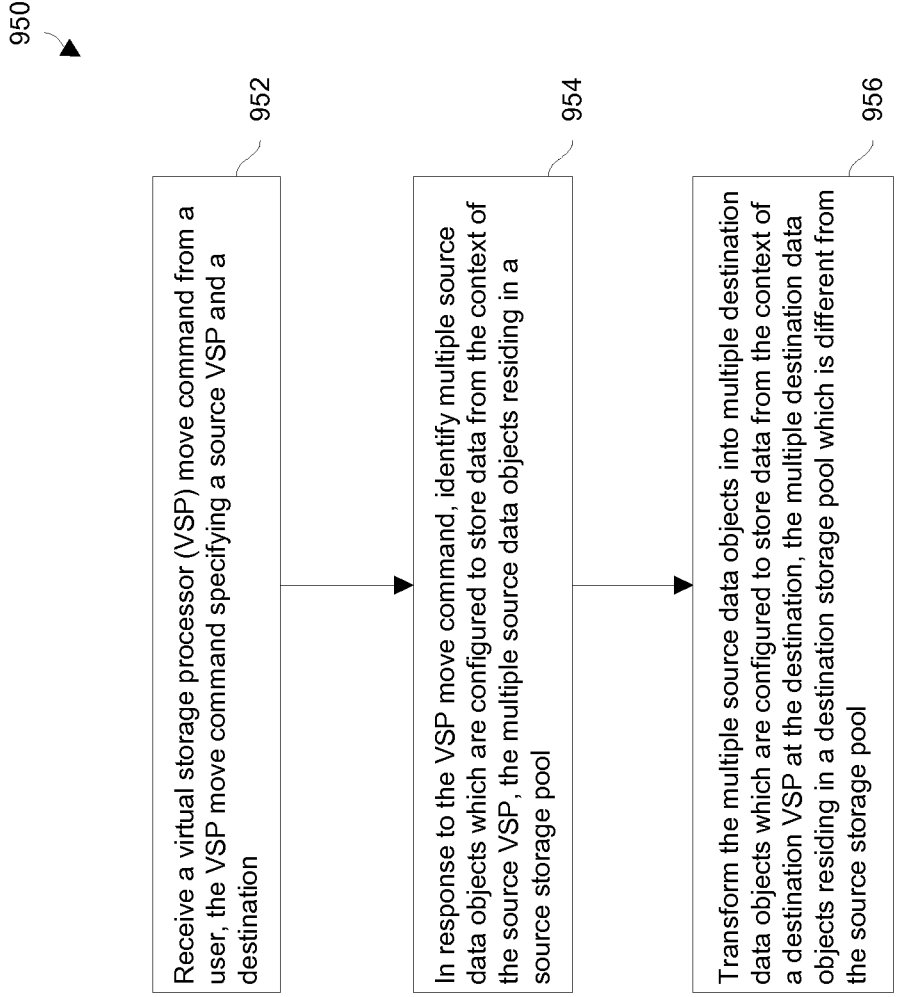

PROVIDING MOBILITY TO VIRTUAL STORAGE PROCESSORS

BACKGROUND

Data storage systems typically include one or more physical storage processors (SPs) accessing an array of disk drives and/or electronic flash drives. Each SP is connected to a network, such as the Internet and/or a storage area network (SAN), and receives transmissions over the network from host computing devices ("hosts"). The transmissions from the hosts include "IO requests," also called "host IOs." Some IO requests direct the SP to read data from an array, whereas other IO requests direct the SP to write data to the array. Also, some IO requests perform block-based data requests, where data are specified by LUN (Logical Unit Number) and offset values, whereas others perform file-based requests, where data are specified using file names and paths. Block-based IO requests typically conform to a block-based protocol, such as Fibre Channel or iSCSI (Internet SCSI, where SCSI is an acronym for Small Computer System Interface), for example. File-based IO requests typically conform to a file-based protocol, such as NFS (Network File System), CIFS (Common Internet File System), or SMB (Server Message Block), for example.

In some data storage systems, an SP may operate one or more virtual data movers. As is known, a virtual data mover is a logical grouping of file systems and servers that is managed by the SP and provides a separate context for managing host data stored on the array. A single SP may provide multiple virtual data movers for different users or groups. For example, a first virtual data mover may organize data for users in a first department of a company, whereas a second virtual data mover may organize data for users in a second department of the company. Each virtual data mover may include any number of host file systems for storing user data.

It should be understood that a first set of virtual data movers may utilize a first pool of storage formed by a first set of storage drives (e.g., flash drives, magnetic disk drives, etc.), and a second set of virtual data movers may utilize a second pool of storage formed by a second set of storage drives. If storage drives are added to the first pool of storage drives, the first set of virtual data movers is able to access more storage. Likewise, if storage drives are added to the second pool of storage drives, the second set of virtual data movers is able to access more storage.

SUMMARY

Unfortunately, there are deficiencies to the above-described conventional approach to simply adding storage drives to a pool of storage. In particular, such an approach is limited in its ability to distribute storage to virtual data movers. For example, when storage drives are added to the above-described first storage pool, only the first set of virtual data movers is able to access the extra storage, i.e., the second set of virtual data movers is unable to access the added storage.

Similarly, suppose that a substantial amount of storage on the first storage pool is freed, e.g., storage becomes available due to data deletion. In this situation, only the first set of virtual data movers is able to enjoy the newly reclaimed storage, and so on.

In contrast to the above-described conventional situation in which virtual data movers are restricted to storage pools, improved techniques are directed to providing mobility to virtual storage processors (VSPs) which define operating environments for file systems accessed by host applications. Such mobility may involve effectively moving VSPs to different storage pools and thus improving flexibility and storage utilization. For example, a VSP is capable of effectively being moved from one storage pool to another to take advantage of storage abundance opportunities. Such operation is even capable of providing a perception that a VSP has migrated from a first physical storage processor to a second physical storage processor.

One embodiment is directed to a method of providing mobility to VSPs. The method includes receiving, by processing circuitry, a VSP move command from a user. The VSP move command specifies a source VSP and a destination (e.g., a destination VSP, a destination location, a destination name, etc.). The method further includes identifying, by the processing circuitry and in response to the VSP move command, multiple source data objects which are configured to store data from the context of the source VSP. The multiple source data objects reside in a source storage pool. The method further includes, after the multiple source data objects are identified, transforming the multiple source data objects into multiple destination data objects which are configured to store data from the context of a destination VSP at the destination. The multiple destination data objects reside in a destination storage pool which is different from the source storage pool. Such operation effectively provides VSP migration from source to destination.

In some arrangements, transforming the multiple source data objects into the multiple destination data objects includes creating a set of replication sessions to replicate the multiple source data objects as the multiple destination data objects. For example, a particular source data object may contain a VSP configuration file system having VSP configuration files which store VSP configuration data. Here, creating the set of replication sessions may include establishing a VSP configuration file system replication session to replicate the VSP configuration file system to the destination VSP.

Additionally, a set of source data objects may contain a set of user files systems having user files which store host data. In such arrangements, creating the set of replication sessions may further include establishing a set of user file system replication sessions to replicate the set of user file systems to the destination VSP. In these arrangements, each user file system replication session may be a standalone session which is independent of the other user file system replication sessions.

In some arrangements, transforming the multiple source data objects into the multiple destination data objects further includes terminating the set of replication sessions and activating the destination VSP. Along these lines, the set of replication sessions are deleted, the destination VSP is configured to access the multiple destination data objects, and the source VSP is deleted.

In some arrangements, a configuration database holds multiple VSP records corresponding to multiple VSPs. In these arrangements, operations such as creating replication sessions, deleting VSPs, etc. involve accessing and updating the configuration database.

In some arrangements, the method further includes, prior to receiving the VSP move command, processing host input/output (I/O) requests directed to a particular user file system using the source VSP. Additionally, the method further includes, after transforming the multiple source data objects into the multiple destination data objects, processing additional host I/O requests directed to the particular user file system using the destination VSP.

In some arrangements, the source VSP resides on a first physical storage processor, and the destination VSP resides on a second physical storage processor. In these arrangements, processing the additional host I/O requests directed to the particular user file system using the destination VSP includes providing, to the user, a perception that the source VSP has migrated from the first physical storage processor to the second physical storage processor.

It should be understood that, in the cloud context, processing circuitry may be formed by remote computer resources distributed over a network. Such a computing environment is capable of providing certain advantages such as enhanced fault tolerance, load balancing, processing flexibility, etc.

Other embodiments are directed to electronic systems and apparatus, processing circuits, computer program products, and so on. Some embodiments are directed to various methods, electronic components and circuitry which are involved in providing mobility to VSPs.

BRIEF DESCRIPTION OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

FIG. 11 is a flowchart of a procedure which is performed to achieve VSP mobility among storage pools.

DETAILED DESCRIPTION

Overview

Figure 1:
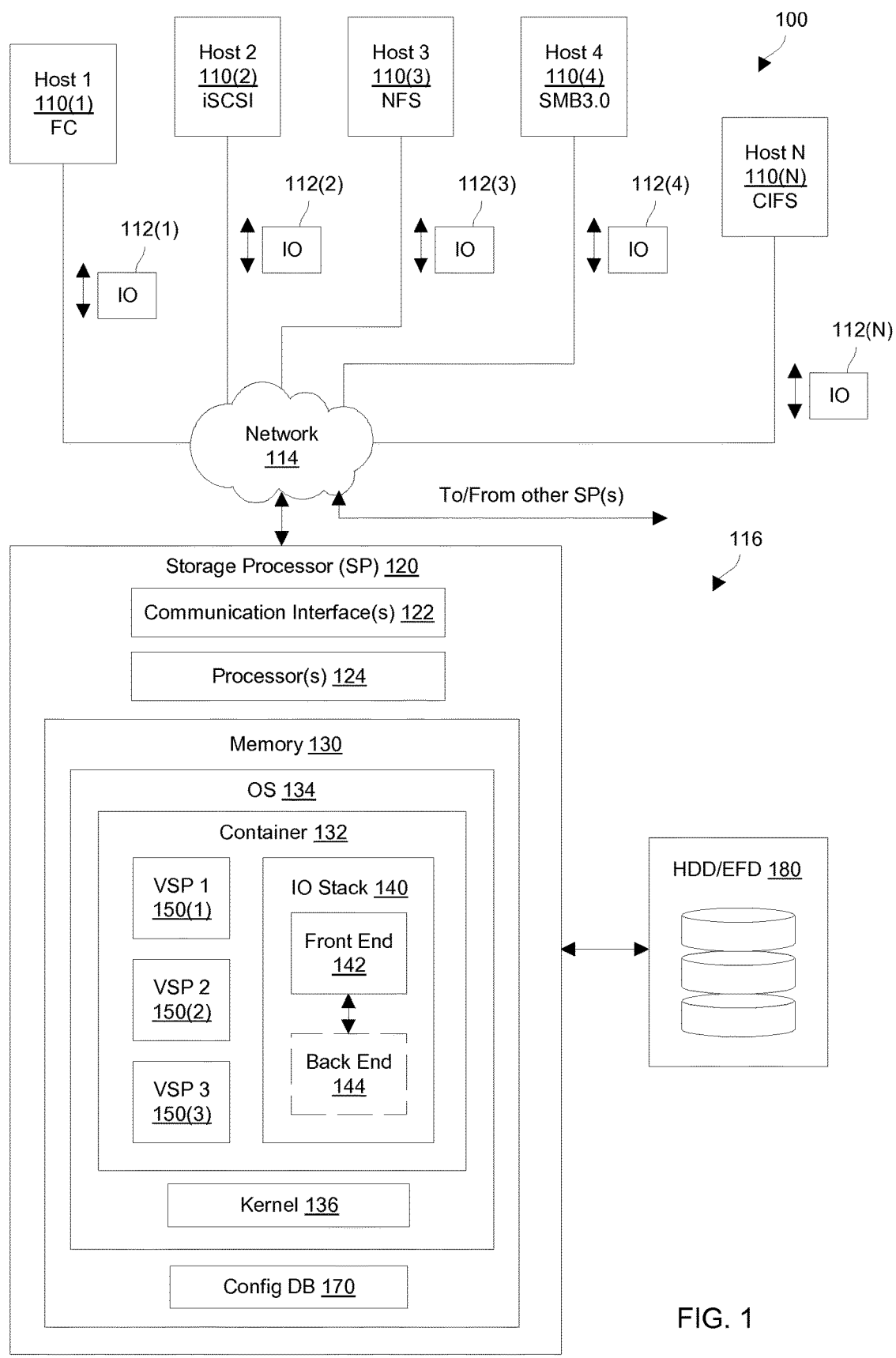
FIG. 1 is a block diagram showing an example data storage apparatus in an environment wherein improved techniques hereof may be practiced, the data storage apparatus including a storage processor having multiple virtualized storage processors (VSPs)

Embodiments of the invention will now be described. It is understood that such embodiments are provided by way of example to illustrate various features and principles of the invention, and that the invention hereof is broader than the specific example embodiments disclosed.

An improved technique is directed to providing mobility to virtual storage processors (VSPs) which define operating environments for file systems accessed by host applications. Such mobility may involve effectively moving VSPs to different storage pools and thus providing flexibility to VSP management and storage utilization. Along these lines, a VSP is capable of effectively being moved from one storage pool to another to take advantage of storage abundance opportunities. Such operation is even capable of providing perception to a user that a VSP has migrated from a first physical storage processor to a second physical storage processor.

It should be understood that the operations underlying such a VSP mobility technique are useful for a variety activities. For example, such operations are suitable for VSP migration, VSP load balancing, VSP failover, none disruptive upgrades of data storage apparatus having VSPs, and so on.

Data Storage System Details

In a typical virtual data mover arrangement, the SP has a root file system with mount points to which the host file systems of each virtual data mover are mounted. Thus, the SP and all its virtual data movers form a single, large directory and all share a common namespace. Hosts can access their virtual data mover-managed data by connecting to the SP over the network, logging on, and specifying paths relative to the SP's root where their data are kept. The typical arrangement thus requires hosts to access data of a virtual data mover using paths that are referenced to and dependent upon the root of the SP.

In addition, settings for prescribing virtual data mover operations are conventionally stored in the root file system of the SP. Many of these settings are global to all virtual data movers operating on the SP; others may be specific to particular virtual data movers.

Unfortunately, the intermingling of virtual data mover content within an SP's root file system impairs the ease of mobility and management of virtual data movers. For example, administrators wishing to move a virtual data mover (e.g., its file systems, settings, and servers) from one SP to another SP must typically perform many steps on a variety different data objects. File systems, server configurations, and other settings may need to be moved one at a time. Also, as the contents of different virtual data movers are often co-located, care must be taken to ensure that changes affecting one virtual data mover do not disrupt the operation of other virtual data movers.

In contrast with the conventional approach, an improved technique for managing host data in a data storage apparatus provides virtualized storage processors (VSPs) as substantially self-describing and independent entities. Each VSP has its own namespace, which is independent of the namespace of any other VSP. Each VSP also has its own network address. Hosts may thus access VSPs directly, without having to include path information relative to the SP on which the VSPs are operated. VSPs can thus be moved from one physical SP to another with little or no disruption to hosts, which may in many cases continue to access the VSPs on the new SPs using the same paths as were used to access the VSPs on the original SPs.

In some examples, each VSP includes within its namespace a configuration file system storing configuration settings for operating the VSP. These configuration settings include, for example, network interface settings and internal settings that describe the VSPs "personality," i.e., the manner in which the VSP interacts on the network. By providing these settings as part of the VSP itself (e.g., within the file systems of the VSP), the VSP can be moved from one physical SP to another substantially as a unit. The increased independence of the VSP from its hosting SP promotes many aspects of VSP management, including, for example, migration, replication, failover, trespass, multi-tenancy, load balancing, and gateway support.

In some examples, the independence of VSPs is further promoted by storing data objects of VSPs in the form of respective files. These data objects may include, for example, file systems, LUNs, virtual storage volumes (vVols), and virtual machine disks (VMDKs). Each such file is part of a set of internal file systems of the data storage apparatus. Providing data objects in the form of files of a set of internal file systems promotes independence of VSPs and unifies management of file-based objects and block-based objects.

In accordance with improvements hereof, certain embodiments are directed to a method of managing host data on a data storage apparatus connected to a network. The method includes storing a network address and a set of host data objects accessible within a namespace of a virtualized storage processor (VSP) operated by a physical storage processor of the data storage apparatus. The namespace includes only names of objects that are specific to the VSP. The method further includes receiving, by the physical storage processor, a transmission over the network from a host computing device. The transmission is directed to a network address and includes an IO request designating a pathname to a host data object to be written or read. The method still further includes identifying the host data object designated by the IO request by (i) matching the network address to which the transmission is directed with the network address stored for the VSP, to identify the VSP as the recipient of the IO request, and (ii) locating the host data object within the namespace of the VSP using the pathname. The IO request is then processed to complete the requested read or write operation on the identified host data object.

Other embodiments are directed to computerized apparatus and computer program products. Some embodiments involve activity that is performed at a single location, while other embodiments involve activity that is distributed over a computerized environment (e.g., over a network).

An improved technique for managing host data in a data storage apparatus provides virtualized storage processors (VSPs) as substantially self-describing and independent constructs.

FIG. 1 shows an example environment 100 in which embodiments of the improved technique hereof can be practiced. Here, multiple host computing devices ("hosts") 110(1) through 110(N), access a data storage apparatus 116 over a network 114. The data storage apparatus 116 includes a physical storage processor, or "SP," 120 and storage 180. The storage 180 is provided, for example, in the form of hard disk drives and/or electronic flash drives. Although not shown in FIG. 1, the data storage apparatus 116 may include multiple SPs like the SP 120. For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs.

The network 114 can be any type of network, such as, for example, a storage area network (SAN), local area network (LAN), wide area network (WAN), the Internet, some other type of network, and/or any combination thereof. In an example, the hosts 110(1-N) connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) in transmissions from the hosts 110(1-N) according to both block-based and file-based protocols and to respond to such IO requests 112(1-N) by reading or writing the storage 180.

The SP 120 is seen to include one or more communication interfaces 122, control circuitry (e.g., a set of processors 124), and memory 130. The communication interfaces 122 include, for example, adapters, such as SCSI target adapters and network interface adapters, for converting electronic and/or optical signals received from the network 114 to electronic form for use by the SP 120. The set of processors 124 includes one or more processing chips and/or assemblies. In a particular example, the set of processors 124 includes numerous multi-core CPUs. The memory 130 includes both volatile memory (e.g., RAM), and non-volatile memory, such as one or more ROMs, disk drives, solid state drives (SSDs), and the like. The set of processors 124 and the memory 130 are constructed and arranged to carry out various methods and functions as described herein. Also, the memory 130 includes a variety of software constructs realized in the form of executable instructions. When the executable instructions are run by the set of processors 124, the set of processors 124 are caused to carry out the operations of the software constructs. Although certain software constructs are specifically shown and described, it is understood that the memory 130 typically includes many other software constructs, which are not shown, such as various applications, processes, and daemons.

As shown, the memory 130 includes an operating system 134, such as Unix, Linux, or Windows™, for example. The operating system 134 includes a kernel 136. The memory 130 is further seen to include a container 132. In an example, the container 132 is a software process that provides an isolated userspace execution context within the operating system 134. In various examples, the memory 130 may include multiple containers like the container 132, with each container providing its own isolated userspace instance. Although containers provide isolated environments that do not directly interact (and thus promote fault containment), different containers can be run on the same kernel 136 and can communicate with one another using inter-process communication (IPC) mediated by the kernel 136. Containers are well-known features of Unix, Linux, and other operating systems.

In the example of FIG. 1, only a single container 132 is shown. Running within the container 132 is an IO stack 140 and multiple virtualized storage processors (VSPs) 150(1-3). The IO stack 140 provides an execution path for host IOs (e.g., 112(1-N)) and includes a front end 142 and a back end 144. The VSPs 150(1-3) each run within the container 132 and provide a separate context for managing host data. In an example, each VSP manages a respective set of host file systems and/or other data objects and uses servers and settings for communicating over the network 114 with its own individual network identity. Although three VSPs are shown, it is understood that the SP 120 may include as few as one VSP or as many VSPs as the computing resources of the SP 120 and storage resources of the storage 180 allow.

Although the VSPs 150(1-3) each present an independent and distinct identity, it is evident that the VSPs 150(1-3) are not, in this example, implemented as independent virtual machines. Rather, all VSPs 150(1-3) operate in userspace and employ the same kernel 136 of the SP 120. Although it is possible to implement the VSPs 150(1-3) as independent virtual machines (each including a virtualized kernel), it has been observed that VSPs perform faster when the kernel 136 is not virtualized.

Also, it is observed that the VSPs 150(1-3) all run within the container 132, i.e., within a single userspace instance. Again, the arrangement shown reflects a deliberate design choice aimed at optimizing VSP performance. It is understood, though, that alternative implementations could provide different VSPs in different containers, or could be provided without containers at all.

The memory 130 is further seen to store a configuration database 170. The configuration database 170 stores system configuration information, including settings related to the VSPs 150(1-3) and their data objects. In other implementations, the configuration database 170 is stored elsewhere in the data storage apparatus 116, such as on a disk drive separate from the SP 120 but accessible to the SP 120, e.g., over a backplane or network.

In operation, the hosts 110(1-N) issue IO requests 112(1-N) to the data storage apparatus 116. The IO requests 112(1-N) may include both block-based requests and file-based requests. The SP 120 receives the IO requests 112(1-N) at the communication interfaces 122 and passes the IO requests to the IO stack 140 for further processing.

At the front end 142 of the IO stack 140, processing includes associating each of the IO requests 112(1-N) with a particular one of the VSPs 150(1-3). In an example, each VSP stores a network address (e.g., an IP address) in a designated location within its file systems. The front end 142 identifies the network address to which each IO request is directed and matches that address with one of the network addresses stored with the VSPs 150(1-3). The front end 142 thus uses the network address to which each IO request is sent to identify the VSP to which the IO request is directed. Further processing of the IO request is then associated (e.g., tagged) with an identifier of the matching VSP, such that the IO request is processed within a particular VSP context. Any data logging, metrics collection, fault reporting, or messages generated while the IO request is being processed are stored with the associated VSP (e.g., in a file system dedicated to the VSP). Also, any path information provided with the IO request (e.g., to a particular directory and file name) is interpreted within the namespace of the identified VSP.

Processing within the front end 142 may further include caching data provided with any write IOs and mapping host data objects (e.g., host file systems, LUNs, vVols, VMDKs, etc.) to underlying files stored in a set of internal file systems. Host IO requests received for reading and writing both file systems and LUNs are thus converted to reads and writes of respective files. The IO requests then propagate to the back end 144, where commands are executed for reading and/or writing the physical storage 180.

In an example, processing through the IO stack 140 is performed by threads maintained by the SP 120 in a set of thread pools. When an IO request is received, a thread is selected from the set of thread pools. The IO request is tagged with a VSP identifier, and the selected thread runs with the context of the identified VSP. Typically, multiple threads from different thread pools contribute to the processing of each IO request (there are many processing layers). Multiple threads from the thread pools can process multiple IO requests simultaneously, i.e., in parallel, on the data objects of any one VSP or multiple VSPs.

Although FIG. 1 shows the front end 142 and the back end 144 together in an "integrated" form, the front end 142 and back end 144 may alternatively be provided on separate SPs. For example, the IO stack 140 may be implemented in a "modular" arrangement, with the front end 142 on one SP and the back end 144 on another SP. The IO stack 140 may further be implemented in a "gateway" arrangement, with multiple SPs running respective front ends 142 and with a back end provided within a separate storage array. The back end 144 performs processing that is similar to processing natively included in many block-based storage arrays. Multiple front ends 142 can thus connect to such arrays without the need for providing separate back ends. In all arrangements, processing through both the front end 142 and back end 144 is preferably tagged with the particular VSP context such that the processing remains VSP-aware.

Figure 2:
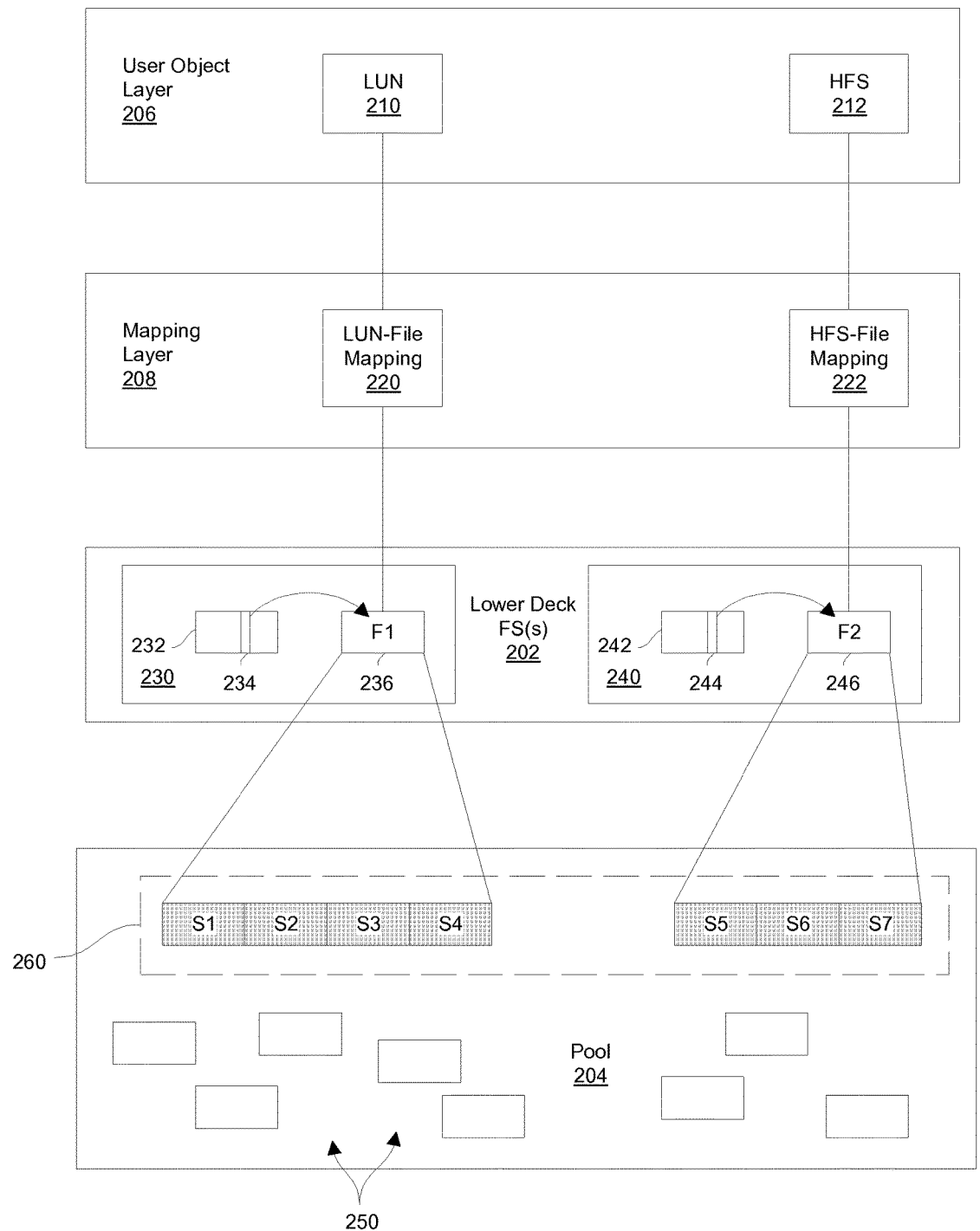
FIG. 2 is a block diagram showing example features of the front end of FIG. 1 in additional detail.

FIG. 2 shows portions of the front end 142 in additional detail. Here, and describing the architecture generally without regard to any particular VSP, it is seen that a set of lower-deck file systems 202 represents LUNs and host file systems in the form of files. Any number of lower-deck file systems 202 may be provided. In one arrangement, a single lower-deck file system may include, as files, any number of LUNs and/or host file systems, as well as their snaps (i.e., point-in-time copies). In another arrangement, a different lower-deck file system is provided for each primary object to be stored, e.g., for each LUN and for each host file system. Additional arrangements provide groups of host file systems and/or groups of LUNs together in a single lower deck file system. The lower-deck file system for any object may include a file storing the object itself, as well as files storing any snaps of the object. Each lower-deck file system 202 has an inode table (e.g., 232, 242), which provides a unique inode for each file stored in the lower-deck file system. The inode table of each lower-deck file system stores properties of each file in the respective lower-deck file system, such as ownership and block locations at which the file's data are stored. Lower-deck file systems are built upon storage elements managed by a storage pool 204.

The storage pool 204 organizes elements of the storage 180 in the form of slices. A "slice" is an increment of storage space, such as 256 MB in size, which is obtained from the storage 180. The pool 204 may allocate slices to lower-deck file systems 202 for use in storing their files. The pool 204 may also deallocate slices from lower-deck file systems 202 if the storage provided by the slices is no longer required. In an example, the storage pool 204 creates slices by accessing RAID groups formed from the storage 180, dividing the RAID groups into FLUs (Flare LUNs), and further dividing the FLU's into slices.

Continuing with reference to the example shown in FIG. 2, a user object layer 206 includes a representation of a LUN 210 and of an HFS (host file system) 212, and a mapping layer 208 includes a LUN-to-file mapping 220 and an HFS-to-file mapping 222. The LUN-to-file mapping 220 maps the LUN 210 to a first file F1 (236), and the HFS-to-file mapping 222 maps the HFS 212 to a second file F2 (246). Through the LUN-to-file mapping 220, any set of blocks identified in the LUN 210 by a host IO request is mapped to a corresponding set of blocks within the first file 236. Similarly, through the HFS-to-file mapping 222, any file or directory of the HFS 212 is mapped to a corresponding set of blocks within the second file 246. The HFS 212 is also referred to herein as an "upper-deck file system," which is distinguished from the lower-deck file systems 202, which are for internal use.

In this example, a first lower-deck file system 230 includes the first file 236 and a second lower-deck file system 240 includes the second file 246. Each of the lower-deck file systems 230 and 240 includes an inode table (232 and 242, respectively). The inode tables 232 and 242 provide information about files in respective lower-deck file systems in the form of inodes. For example, the inode table 232 of the first lower-deck file system 230 includes an inode 234, which provides file-specific information about the first file 236. Similarly, the inode table 242 of the second lower-deck file system 240 includes an inode 244, which provides file-specific information about the second file 246. The information stored in each inode includes location information (e.g., block locations) where the respective file is stored, and may thus be accessed as metadata to identify the locations of the files 236 and 246 in the storage 180.

Although a single file is shown for each of the lower-deck file systems 230 and 240, it is understood that each of the lower-deck file systems 230 and 240 may include any number of files, each with its own entry in the respective inode table. In one example, each lower-deck file system stores not only the file F1 or F2 for the LUN 210 or HFS 212, but also snaps of those objects. For instance, the first lower-deck file system 230 stores the first file 236 along with a different file for every snap of the LUN 210. Similarly, the second lower-deck file system 240 stores the second file 246 along with a different file for every snap of the HFS 212.

As shown, a set of slices 260 is allocated by the storage pool 204 for storing the first file 236 and the second file 246. In the example shown, slices S1 through S4 are used for storing the first file 236, and slices S5 through S7 are used for storing the second file 246. The data that make up the LUN 210 are thus stored in the slices S1 through S4, whereas the data that make up the HFS 212 are stored in the slices S5 through S7.

In some examples, each of the lower-deck file systems 230 and 240 is associated with a respective volume, such as a sparse LUN. Sparse LUNs provide an additional layer of mapping between the lower-deck file systems 202 and the pool 204 and allow the lower-deck file systems to operate as file systems normally do, by accessing underlying volumes. Additional details about sparse LUNs and their relation to lower-deck file systems may be found in U.S. Pat. No. 7,631,155, which is hereby incorporated by reference in its entirety. The incorporated patent uses the term "container file system" to refer to a construct similar to the lower-deck file system disclosed herein.

Although the example of FIG. 2 shows storage of a LUN 210 and a host file system 212 in respective lower-deck file systems 230 and 240, it is understood that other data objects may be stored in one or more lower-deck file systems in a similar manner. These may include, for example, file-based vVols, block-based vVols, and VMDKs.

Figure 3:
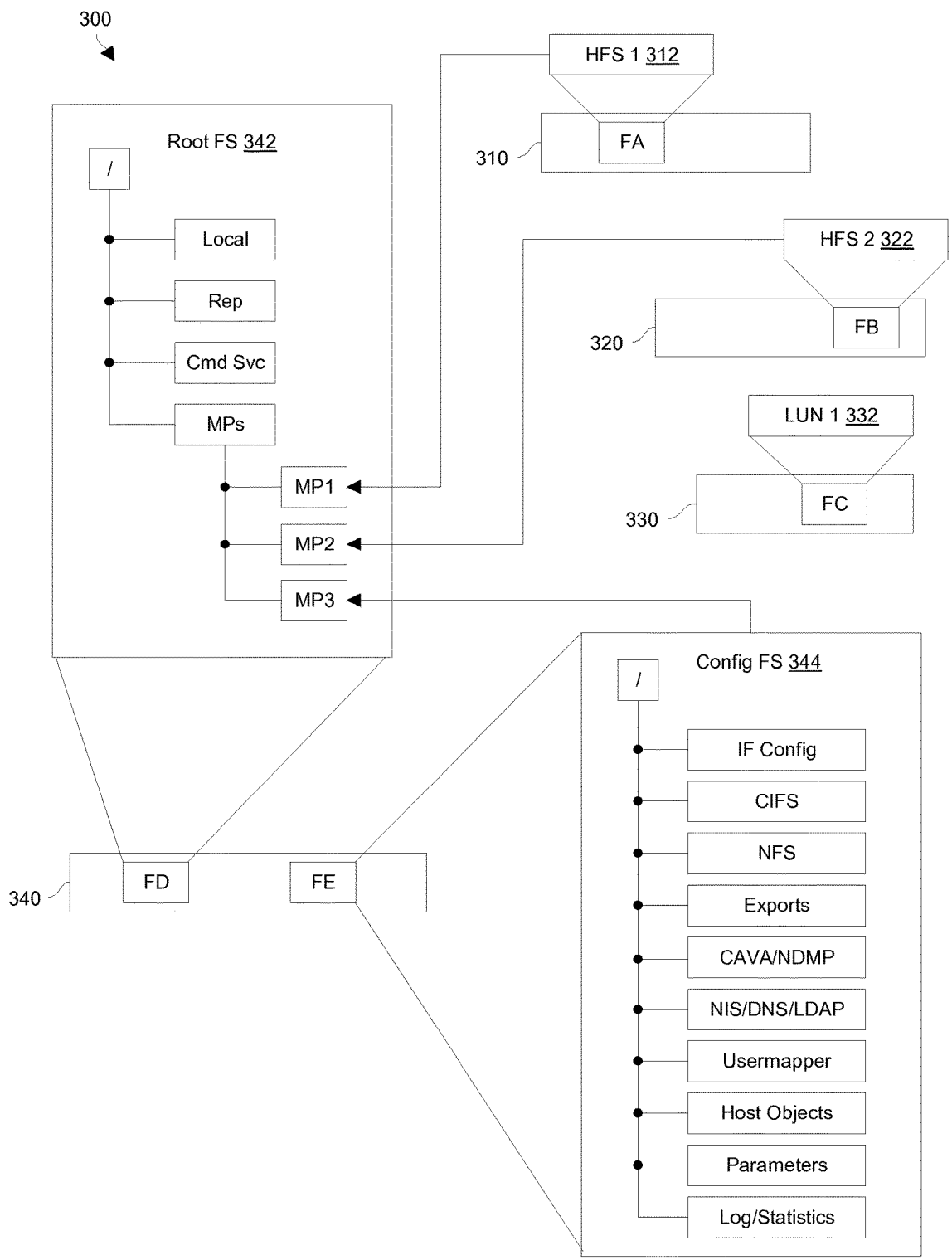
FIG. 3 is a block diagram showing an example set of file systems of a VSP of FIG. 1.

FIG. 3 shows an example set of components of the data storage apparatus 116 that are associated with a particular VSP 300 (i.e., any of the VSPs 150(1-3)). The components shown in FIG. 3 include components that are managed in the context of the VSP 300 and components that form the "personality" of the VSP 300. These components may be referred to herein as "included" within the VSP 300, by which it is meant that the components are associated with the VSP 300 within the data storage apparatus 116 and are not associated with any other VSP. It is thus seen that the VSP 300 "includes" a number of lower-deck file systems hosting various host data objects, as well as internal data objects.

For example, the VSP 300 includes a first lower-deck file system 310 and a second lower-deck file system 320. The first lower-deck file system 310 includes a file FA, which provides a file representation of a first host file system 312. Similarly, the second lower-deck file system 320 includes a file FB, which provides a file representation of a second host file system 322. The host file systems 312 and 322 are upper-deck file systems, which may be made available to hosts 110(1-N) for storing file-based host data. HFS-to-file mappings, like the HFS-to-file mapping 222, are understood to be present (although not shown in FIG. 3) for expressing the files FA and FB in the form of upper-deck file systems. Although only two host file systems 312 and 322 are shown, it is understood that the VSP 300 may include any number of host file systems. In an example, a different lower-deck file system is provided for each host file system. The lower-deck file system stores the file representation of the host file system, and, if snaps are turned on, any snaps of the host file system. In a similar manner to that described in connection with FIG. 2, each of the lower-deck file systems 310 and 320 includes a respective inode table, allowing the files FA and FB and their snaps to be indexed within the respective lower-deck file systems and accessed within the storage 180.

In some examples, the VSP 300 also includes one or more lower-deck file systems for storing file representations of LUNs. For example, a lower-deck file system 330 stores a file FC, which provides a file representation of a LUN 332. A LUN-to-file mapping (not shown but similar to the mapping 320) expresses the file FC in the form of a LUN, which may be made available to hosts 110(1-N) for storing block-based host data. In an example, the lower-deck file system 330 stores not only the file FC, but also snaps thereof, and includes an inode table in essentially the manner described above.

The VSP 300 further also includes a lower-deck file system 340. In an example, the lower-deck file system 340 stores file representations FD and FE of two internal file systems of the VSP 300—a root file system 342 and a configuration file system 344. In an alternative arrangement, the files FD and FE are provided in different lower-deck file systems. In an example, the lower-deck file system 340 also stores snaps of the files FD and FE, and files are accessed within the lower-deck file system 340 via file system-to-file mappings and using an inode table, substantially as described above.

In an example, the root file system 342 has a root directory, designated with the slash ("/"), and sub-directories as indicated. Any number of sub-directories may be provided within the root file system in any suitable arrangement with any suitable file structure; the example shown is merely illustrative. As indicated, one sub-directory ("Local") stores, for example, within constituent files, information about the local environment of the SP, such as local IP sub-net information, geographical location, and so forth. Another sub-directory ("Rep") stores replication information, such as information related to any ongoing replication sessions. Another sub-directory ("Cmd Svc") stores command service information, and yet another sub-directory ("MPs") stores mount points.

In the example shown, the directory "MPs" of the root file system 342 provides mount points (e.g., directories) on which file systems are mounted. For example, the host file systems 312 and 322 are respectively mounted on mount points MP1 and MP2, and the configuration file system 344 is mounted on the mount point MP3. In an example, establishment of the mount points MP1-MP3 and execution of the mounting operations for mounting the file systems 312, 322, 344 onto the mount points MP1-MP4 are provided in a batch file stored in the configuration file system 344 (e.g., in Host Objects). It is understood that additional mount points may be provided for accommodating additional file systems.

The root file system 342 has a namespace, which includes the names of the root directory, sub-directories, and files that belong to the root file system 342. The file systems 312, 322, and 344 also each have respective namespaces. The act of mounting the file systems 312, 322, and 344 onto the mount points MP1, MP2, and MP3 of the root file system 342 serves to join the namespace of each of the file systems 312, 322, and 344 with the namespace of the root file system 342, to form a single namespace that encompasses all the file systems 312, 322, 342, and 344. This namespace is specific to the VSP 300 and is independent of namespaces of any other VSPs.

Also, it is understood that the LUN 332 is also made available to hosts 110*a-n* through the VSP 300. For example, hosts 110*a-n* can send read and write IO requests to the LUN 332 (e.g., via Fibre Channel and/or iSCSI commands) and the SP 120 services the requests for the VSP 300, e.g., by operating threads tagged with the context of the VSP 300. Although FIG. 3 shows both the LUN 322 and the host file systems 312 and 322 together in a single VSP 300, other examples may provide separate VSPs for LUNs and for file systems.

Although the VSP 300 is seen to include file systems and LUNs, other host objects may be included, as well. These include, for example, file-based vVols, block-based vVols, and VMDKs. Such host objects may be provided as file representations in lower-deck file systems and made available to hosts 110*a-n*.

As its name suggests, the configuration file system 344 stores configuration settings for the VSP 300. These settings include settings for establishing the "personality" of the VSP 300, i.e., the manner in which the VSP 300 interacts over the network 114. Although the configuration file system 344 is shown with a particular directory structure, it is understood that any suitable directory structure can be used. In an example, the configuration file system 344 stores the following elements:

IF Config. Interface configuration settings of any network interface used for processing IO requests and tagged with a context of the VSP 300. IF Config includes the IP address of the VSP, as well as related network information, such as sub-masks and related IP information.

CIFS. Configuration settings and names of one or more CIFS servers used in the context of the VSP 300. The CIFS servers manage IO requests provided in the CIFS protocol. By including the CIFS configuration within the configuration file system 344, the CIFS configuration becomes part of the VSP 300 itself and remains with the VSP 300 even as the VSP 300 is moved from one SP to another SP. This per-VSP configuration of CIFS also permits each VSP to have its own customized CIFS settings, which may be different from the settings of CIFS servers used by other VSPs.

NFS. Configuration settings and names of one or more NFS servers used in the context of the VSP 300. The NFS servers manage IO requests provided in the NFS protocol. By including the NFS configuration within the configuration file system 344, the NFS configuration becomes part of the VSP 300 itself and remains with the VSP 300 even as the VSP 300 is moved from one SP to another SP. This per-VSP configuration of NFS also permits each VSP to have its own customized NFS settings, which may be different from the settings of NFS servers used by other VSPs.

Exports. NFS exports, CIFS shares, and the like for all supported protocols. For security and management of host access, users are typically given access only to specified resources mounted to the root file system 342, e.g., host file systems, sub-directories of those file systems, and/or particular LUNs. Access to these resources is provided by performing explicit export/share operations, which expose entry points to the resources for host access. In an example, these export/share operations are included within one or more batch files, which may be executed when the VSP 300 is started. Exports are typically VSP-specific, and depend upon the particular data being hosted and the access required.

CAVA/NDMP: CAVA (Celerra Anti-Virus Agent) configuration file, including location of external server for performing virus checking operations. NDMP (Network Data Management Protocol) provides backup configuration information. CAVA and NDMP settings are configurable on a per-VSP basis.

NIS/DNS/LDAP: Local configurations and locations of external servers for providing resolution of IP addresses. NIS (Network Information Service), DNS (Directory Name System), and LDAP (Lightweight Directory Access Protocol) settings are configurable on a per-VSP basis. The DNS configuration stores local host name and domain name of the VSP 300, as well as the location of a DNS server for resolving host names.

Host Objects: Identifiers for all host file systems (e.g., 312 and 322), LUNs (e.g., LUN 332), and other host objects included within the VSP 300. Host objects may also include batch files and/or lists of instructions for establishing mount points in the root file system 342 and for mounting the host file system(s) and LUN(s) to the mount points.

Parameters: Low-level settings (e.g., registry settings) for configuring VSP 300. These include cache settings and settings for specifying a maximum number of threads running on the SP 120 that may be used to service IO requests within the context of the VSP 300. Parameters are configurable on a per-VSP basis.

Statistics: Metrics, log files, and other information pertaining to activities within the context of the VSP 300. Statistics are updated as they accumulate. Many configuration settings are established at startup of the VSP 300. Some configuration settings are updated as the VSP 300 is operated. The configuration file system 344 preferably does not store host data.

Although FIG. 3 has been shown and described with reference to a particular VSP 300, it is understood that all of the VSPs 150(1-3) may include a root file system, a configuration file system, and at least one host file system or LUN, substantially as shown. Particular host objects and configuration settings differ, however, from one VSP to another.

By storing the configuration settings of VSPs within the file systems of the VSPs themselves and providing a unique namespace for each VSP, VSPs are made to be highly independent, both of other VSPs and of the particular SPs on which they are provided. For example, migrating a VSP from a first data storage system to a second data storage system involves copying its lower-deck file systems (or some subset thereof) from a source SP on the first data storage system to a target SP on the second, starting the VSP's servers on the target SP in accordance with the configuration settings, and resuming operation on the target SP. As the paths for accessing data objects on VSPs are not rooted to the SPs on which they are run, hosts may often continue to access migrated VSPs using the same instructions as were used prior to moving the VSPs. Similar benefits can be enjoyed when moving a VSP from one SP to another SP in the same data storage system. To move a VSP from a first SP to a second SP, The VSP need merely be shut down (i.e., have its servers stopped) on the first SP and resumed (i.e., have its servers started up again) on the second SP.

Figure 4:
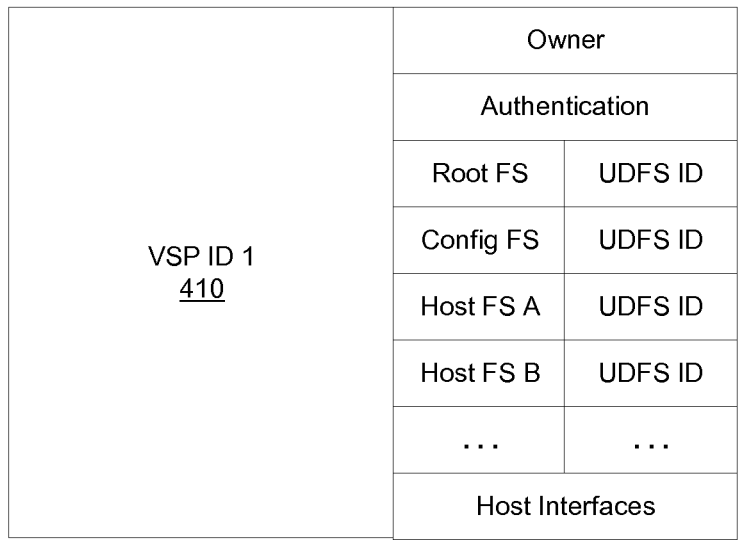
FIG. 4 is a table showing an example set of records stored in a configuration database that defines a VSP that can be run on the storage processor of FIG. 1.

FIG. 4 shows an example record 400 of the configuration database 170, which are used to define a particular VSP having a VSP identifier (ID) 410. The VSP ID 410 may identify one of the VSPs 150(1-3) or some other VSP of the data storage apparatus 116. The record 400 specifies, for example, an owning SP (physical storage processor), authentication, and identifiers of the data objects associated with the listed VSP. The data object identifiers include identifiers of the root file system, configuration file system, and various host file systems (or other host objects) that may be accessed in the context of the listed VSP. The record 400 may also identify the lower-deck file system used to store each data object. The record 400 may further specify host interfaces that specify IO protocols that the listed VSP is equipped to handle.

Although FIG. 4 shows only a single record 400 for a single VSP, it is understood that the configuration database 170 may store records, like the record 400, for any number of VSPs, including all VSPs of the data storage apparatus 116. During start-up of the data storage apparatus 116, or at some other time, a computing device of the data storage apparatus 116 reads the configuration database 170 and launches a particular VSP or a group of VSPs on the identified SPs. As a VSP is starting, the SP that owns the VSP reads the configuration settings of the configuration file system 344 to configure the various servers of the VSP and to initialize its communication protocols. The VSP may then be operated on the identified SP, i.e., the SP may then be operated with the particular VSP's context.

It is understood that VSPs 150(1-3) operate in connection with the front end 142 of the IO stack 140. The VSPs 150(1-3) thus remain co-located with their respective front ends 142 in modular and gateway arrangements.

Figure 5A:
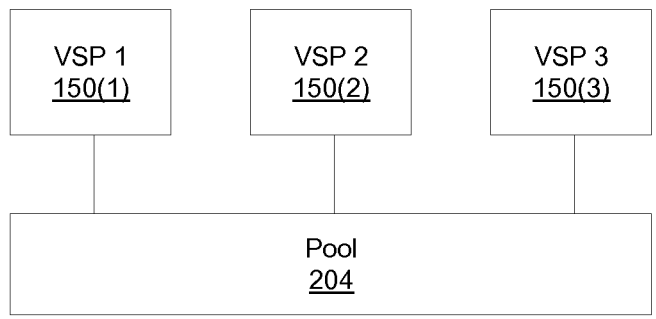
FIGS. 5A and 5B are block diagrams showing example arrangements of virtualized storage processors.
Figure 5B:
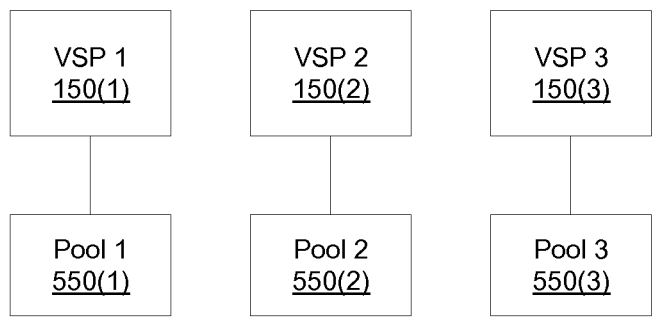

FIGS. 5A and 5B show two different example arrangements of VSPs. In FIG. 5A, the VSPs 150(1-3) access the storage pool 204. Thus, the lower-deck file systems of the VSPs 150(1-3) all derive the slices needed to store their underlying file systems and other data objects from the pool 204. In FIG. 5B, multiple storage pools 550(1-3) are provided, one for each of the VSPs 150(1-3), respectively. Providing different pools for respective VSPs promotes data isolation among the VSPs, and may be better suited for applications involving multiple tenants in which each tenant's data must be kept separate from the data of other tenants.

Figure 6:
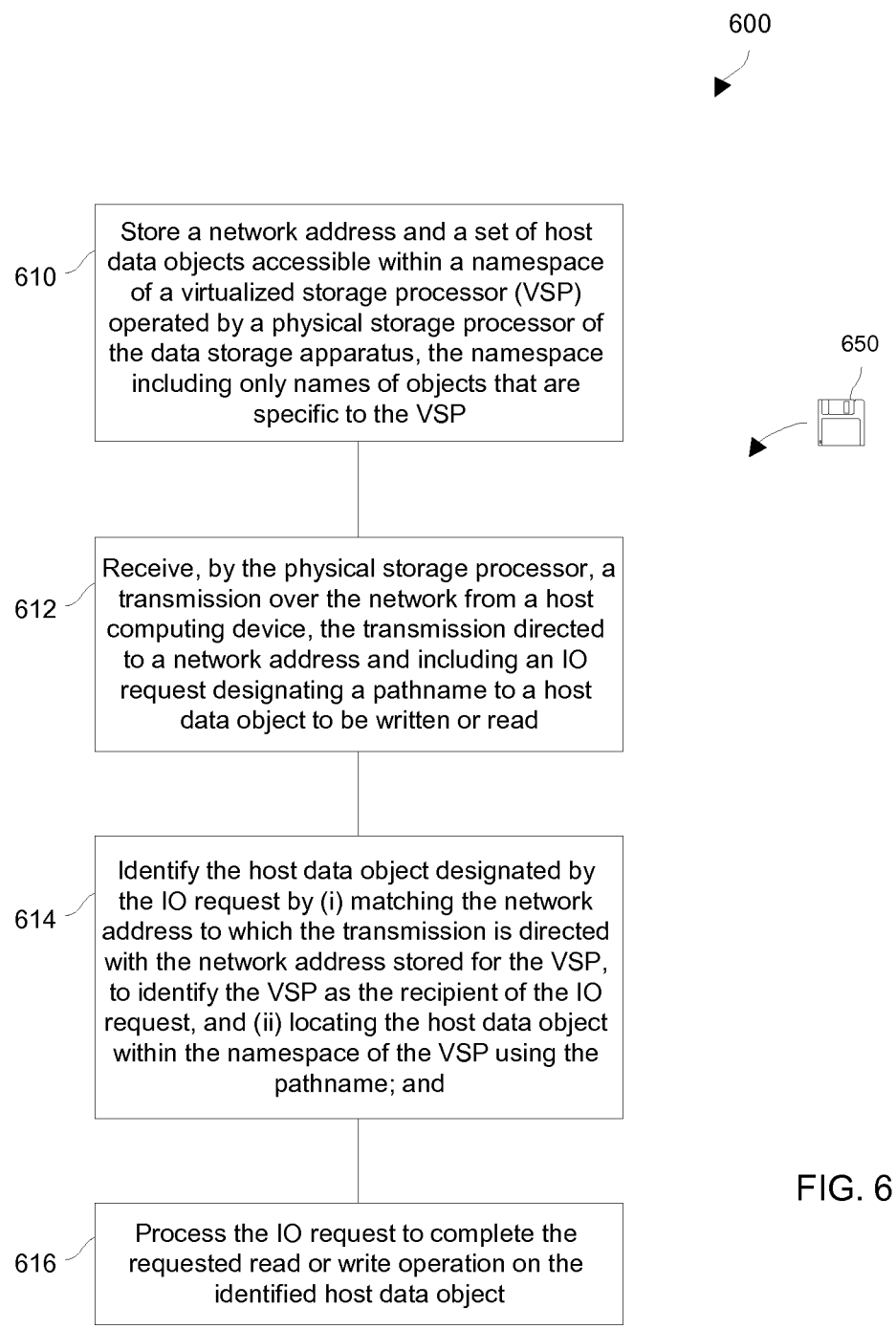
FIG. 6 is a flowchart showing an example process for managing host data using a VSP.

FIG. 6 shows an example method 600 for managing host data on a data storage apparatus connected to a network. The method 600 that may be carried out in connection with the data storage apparatus 116. The method 600 is typically performed by the software constructs, described in connection with FIGS. 1-3, which reside in the memory 130 of the storage processor 120 and are run by the set of processors 124. The various acts of the method 600 may be ordered in any suitable way. Accordingly, embodiments may be constructed in which acts are performed in orders different from those illustrated, which may include performing some acts simultaneously, even though the acts are shown as sequential in the illustrated embodiments.

At step 610, a network address and a set of host data objects are stored in a data storage apparatus. The set of host data objects are accessible within a namespace of a virtualized storage processor (VSP) operated by a physical storage processor of the data storage apparatus. The namespace includes only names of objects that are specific to the VSP. For example, an IP address of the VSP 300 is stored in a file of a directory of the configuration file system 344. The VSP 300 runs on the SP 120 of the data storage apparatus 116. A set of host objects, including host file systems 312 and 322, and LUN 332, are also stored in the data storage apparatus 116. These host objects are made accessible within the namespace of the VSP 300 by mounting these data objects to mount points MP1-MP4 within the root file system 342 and thus merging their namespaces with that of the root file system 342. The resulting merged namespace includes only names of objects that are specific to the VSP 300.

At step 612, a transmission is received by the physical storage processor over the network from a host computing device. The transmission is directed to a network address and includes an IO request designating a pathname to a host data object to be written or read. For example, the SP 120 receives a transmission over the network 114 from one of the hosts 110(1-N). The transmission is directed to a particular IP address and includes an IO request (e.g., one of 112(1-N)). The IO request designates a location of a host data object to be written or read (e.g., a pathname for a file-based object or a block designation for a block-based object). The location may point to any of the host file systems 312 or 322, to the LUN 332, or to any file or offset range accessible through the host file systems 312 or 322 or the LUN 332, respectively. The location may also point to a vVol or VMDK, for example, or to any other object which is part of the namespace of the VSP 300.

At step 614, the host data object designated by the IO request is identified by (i) matching the network address to which the transmission is directed with the network address stored for the VSP, to identify the VSP as the recipient of the IO request, and (ii) locating the host data object within the namespace of the VSP using the pathname. For example, each of the VSPs 150(1-3) stores an IP address in its configuration file system 344. When an IO request is received, an interface running within the front end 142 of the IO stack 140 checks the IP address to which the IO request is directed and matches that IP address with one of the IP addresses stored for the VSPs 150(1-3). The VSP whose IP address matches the IP address to which the IO request is directed is identified as the recipient of the IO request. The IO request arrives to the SP 120 with a pathname to the host data object to be accessed. The front end 142 looks up the designated pathname within the identified VSP to identify the particular data object to which the IO request is directed.

At step 616, the IO request is processed to complete the requested read or write operation on the identified host data object. For example, the front end 142 and the back end 144 process the IO request to perform an actual read or write to the designated host data object on the storage 180.

An improved technique has been described for managing host data in a data storage apparatus. The technique provides virtualized storage processors (VSPs) as substantially self-describing and independent entities. Each VSP has its own namespace, which is independent of the namespace of any other VSP. Each VSP also has its own network address.

Hosts may thus access VSPs directly, without having to include path information relative to the SP on which the VSP is operated. VSPs can thus be moved from one physical SP to another with little or no disruption to hosts, which may continue to access the VSPs on the new SPs using the same paths as were used when the VSPs were running on the original SPs.

As used throughout this document, the words "comprising," "including," and "having" are intended to set forth certain items, steps, elements, or aspects in an open-ended fashion. Also, and unless explicitly indicated to the contrary, the word "set" as used herein indicates one or more of something. Although certain embodiments are disclosed herein, it is understood that these are provided by way of example only and the invention is not limited to these particular embodiments.

Having described certain embodiments, numerous alternative embodiments or variations can be made. For example, embodiments have been shown and described in which host file systems, LUNs, vVols, VMDKs, and the like are provided in the form of files of underlying lower-deck file systems. Although this arrangement provides advantages for simplifying management of VSPs and for unifying block-based and file-based operations, the use of lower-deck file systems is merely an example. Indeed, host file systems, LUNs, vVols, VMDKs, and the like may be provided for VSPs in any suitable way.

Also, although the VSPs 150(1-3) are shown and described as userspace constructs that run within the container 132, this is also merely an example. Alternatively, different VSPs may be provided in separate virtual machines running on the SP 120. For example, the SP 120 is equipped with a hypervisor and a virtual memory manager, and each VSP runs in a virtual machine having a virtualized operating system.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 650 in FIG. 6). Multiple computer-readable media may be used. The medium (or media) may be encoded with instructions which, when executed on one or more computers or other processors, implement the various methods described herein. Such medium (or media) may be considered an article of manufacture or a machine, and may be transportable from one machine to another.

Replication Details

Figure 7:
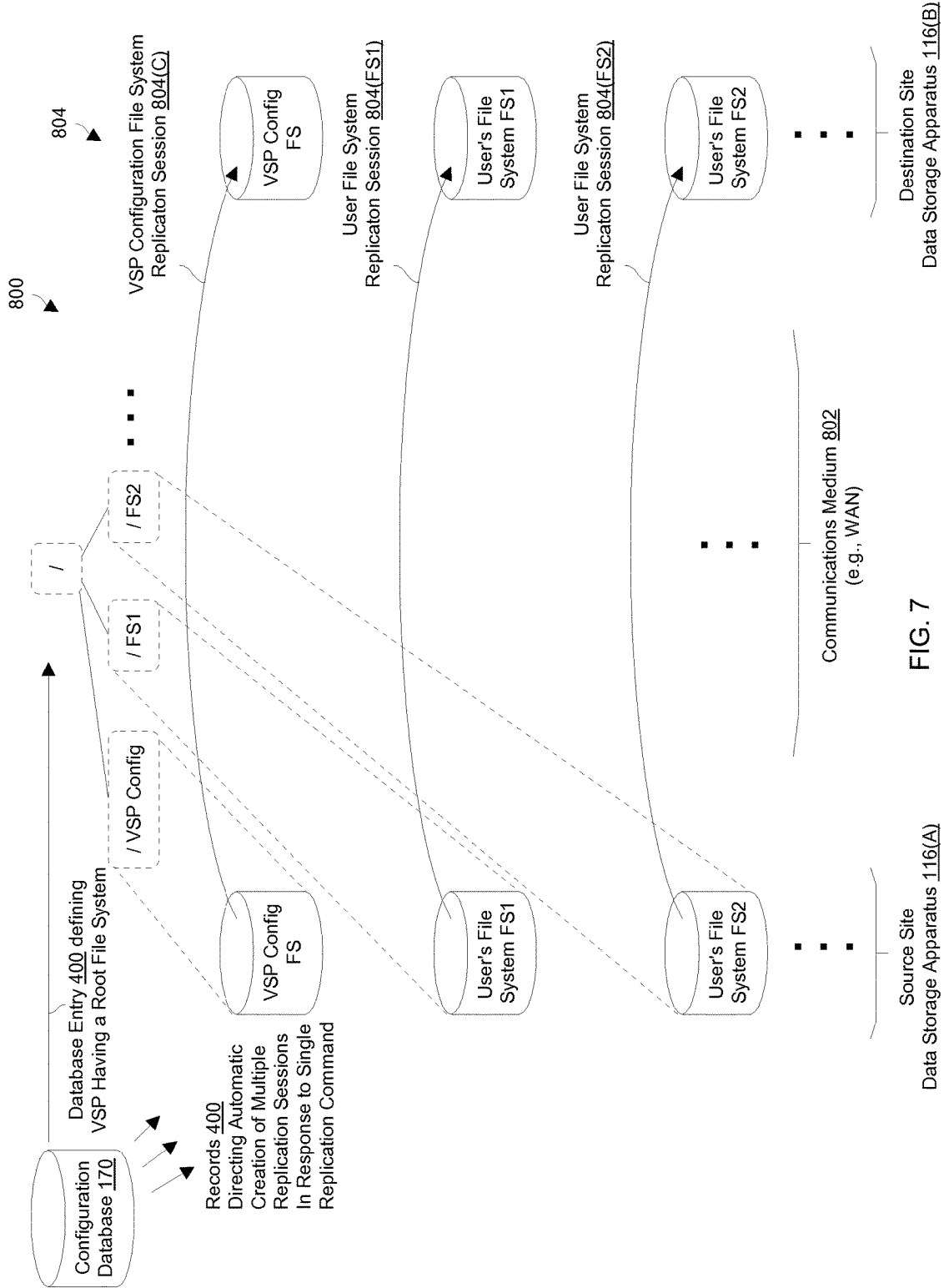
FIG. 7 is a block diagram illustrating particular details of a replication procedure which is performed by a data storage system when a user enters a single replication command into a user interface.

FIG. 7 shows particular details of a replication procedure which is performed by a data storage system 800 when a user enters a single replication command into a user interface. Although certain data storage apparatus details are purposefully omitted from FIG. 7 for simplicity (also see FIG. 1), it should be understood that the data storage system 800 includes a source site data storage apparatus 116(A), a destination site data storage apparatus 116(B), and a communications medium 802 (e.g., a wide area network or WAN) through which the apparatus 116(A), 116(B) communicate. It should be further understood that the user may enter commands into the data storage system 800 via a control console or terminal (e.g., a user interface at either site) by simply typing into a command line interface, operating a pointing device via a specialized graphical user interface (GUI), and so on.

Initially and by way of example, suppose that the configuration database 170 of the source site data storage apparatus 116(A) includes a particular database record 400 for a particular VSP (also see FIGS. 1 and 4). The particular VSP defined by the particular database record 400 has a root file system "/" and appropriate mount points on which to mount other file systems.

Further suppose that the particular database record 400 (and/or other records 400 of the configuration database 170) define other file systems which are mounted to the root file system of the particular VSP. In this example and as shown in FIG. 7 (see dashed lines), a VSP configuration file system "/VSP Config" and two user file systems "/FS1", "/FS2" are mounted to the root file system of the particular VSP.

As described earlier in connection with FIG. 3, the VSP configuration file system "/VSP Config" includes VSP configuration data which defines an operating environment for the particular VSP (e.g., a network address, CIFS settings, NFS settings, and so on). Accordingly, the personality or identity of the particular VSP is defined by the VSP configuration data in the VSP configuration file system.

The user file systems "/FS1", "/FS2" include host data provided by host applications. Since the VSP configuration file system "/VSP Config" defines the operating environment for the user file systems "/FS1", "/FS2", accessibility of any replicas of the user file systems "/FS1", "/FS2" requires presence of the VSP configuration file system "/VSP Config".

Now, suppose that a user (e.g., an administrator of the data storage system 800) wishes to replicate the particular VSP and the file systems which are mounted to the particular VSP to the destination site data storage apparatus 116(B). Prior to starting replication, the user may have created an interconnect between the source site data storage apparatus 116(A) and the destination site data storage apparatus 116(B) (i.e., a secure and reliable communications pathway). Additionally, the root file system "/" of the particular VSP may have already been created, and the user may have already mounted the various files systems to the root file system. Accordingly, records 400 in the configuration database 170 have been updated to reflect this activity.

At this point, the user is ready to simply enter a single replication command. That is, rather than separately enter replication commands to begin replication sessions for each file system as in a conventional approach, all the user needs to do is enter one replication command to effectuate such replication. Additionally, the entire lifecycle of a replication session (i.e., create, delete, reverse, switchover, modify, failover, stop, start, etc.) which otherwise applies at the file system level now applies at the VSP level. Furthermore, replication of the internals of the VSP (e.g., the root, the VSP configuration data, etc.) are entirely hidden from the end user who simply manages the replication session. A suitable syntax for such a single replication command is:

$ nas_replicate-create_all-source src_VSP-destination dest_VSP where "nas_replicate" is the specific instruction, "-create_all" is an option directing replication of all mounted file systems, "-source src_VSP" is an option identifying the particular VSP ("src_VSP") of the source site data storage apparatus 116(A), and "-destination dest_VSP" is an option identifying a corresponding VSP ("dest_VSP") to be created on the destination site data storage apparatus 116(B). Other options can be included as well such as an option that identifies a particular pre-established interconnect by name, another option that specifies a maximum time in which the VSPs can be out of sync (e.g., 30 seconds, one minute, etc.), and so on.

In response to the single replication command, the processing circuitry 124 of the source site data storage apparatus 116(A) accesses the configuration database 170 to identify which file systems are mounted to the root file system of the particular VSP. In the context of a set of processors executing software, it should be understood that executable code for carrying out automated creation of multiple replication sessions may reside in the front end 142 of the IO stack 140 (also see FIG. 1).

In this example, the processing circuitry 124 sees that there are at least three files systems (i.e., the VSP configuration file system and two user files systems) that are mounted to the root file system of the particular VSP which are to be replicated. Accordingly, the processing circuitry 124 automatically creates multiple replications sessions 804 to replicate the mounted file systems.

In particular, the processing circuitry 124 makes sure that a corresponding root file system "/" exists on the data storage apparatus 116(B) at the destination site and, if not, directs the data storage apparatus 116(B) to create a corresponding root file system "/". The processing circuitry 124 then creates a VSP configuration file system replication session 804(C) to replicate the VSP configuration file system. Additionally, the processing circuitry 124 creates user file system replication sessions 804(FS1), 804(FS2) to replicate the user file systems FS1, FS2. Each replication session 804 properly mounts a respective file system to the root file system "/" of the data storage apparatus 116(B) and begins file system replication (e.g., synchronous replication, asynchronous replication, snap, etc.). It should be understood that each replication session 804 is independent and independent and operates in a standalone manner with respect to the other replication sessions 804.

With replication of the VSP configuration file system in place, the operating environment at the destination site is now established to enable reliable and robust access to the user files system via the destination data storage apparatus 116(B), e.g., read only access while the source data storage apparatus 116(A) operates as the source site.

However, in response to a failover event in which replication of a user file system is stopped, the circuitry of the destination data storage apparatus 116(B) transitions that user file system at the destination data storage apparatus 116(B) from a host read-only state to a host read/write state. Such operation enables read/write access to continue at the destination data storage apparatus 116(B) while other replication sessions of the multiple replication sessions continue to operate in their original states.

At this point, it should be understood that various other replication related operations are suitable for use in combination with the above-described VSP replication activities. For example, the automatically created replication sessions 804 can be stopped, started, reversed, switched over, deleted, and so on. Furthermore, such sessions 804 can be controlled in the aggregate (together as a group), or individually, in response to other user commands.

Figure 8:
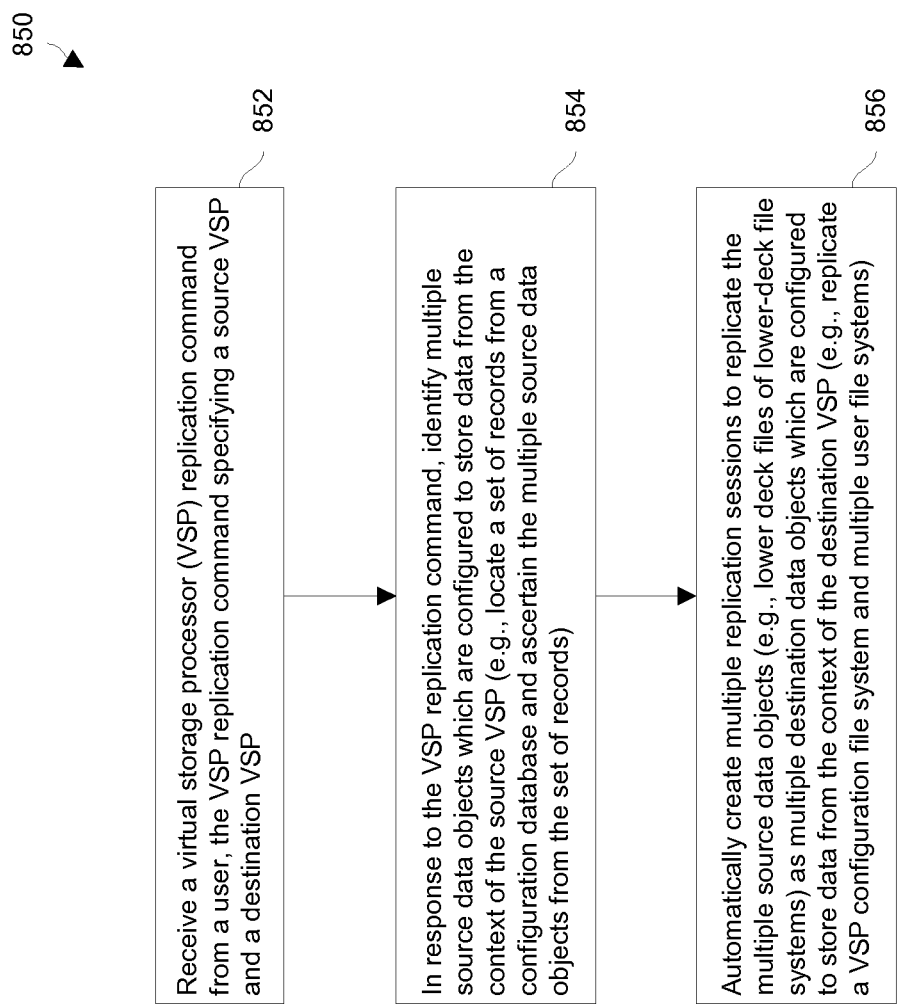
FIG. 8 is a flowchart of a procedure which is performed by the data storage system to establish multiple replication sessions in response to a single replication command.

FIG. 8 is a flowchart of a procedure 850 which is performed by the data storage system 800 to perform replication. At 852, the processing circuitry of the data storage system 800 receives a VSP replication command from a user. The VSP replication command specifies a source VSP and a destination VSP.

At 854, in response to the VSP replication command, the processing circuitry identifies multiple source data objects which are configured to store data from the context of the source VSP (e.g., the source data objects store data using an operating environment which is defined by the source VSP).

Along these lines, the configuration database 170 stores a set of records 400 which indicates which file systems are mounted to the root file system of the source VSP, and among the files systems is a configuration file system storing VSP configuration data (i.e., VSP "personality" information, also see FIG. 3). Recall that the data objects may be lower-deck files 236, 246 of lower-deck file systems 202 containing, as the user file systems, upper-deck file systems formed of upper-deck files (also see FIG. 2).

At 856, after the multiple source data objects are identified, the processing circuitry automatically creates multiple replication sessions 804 to replicate the multiple source data objects as multiple destination data objects which are configured to store data from the context of the destination VSP. During these replication sessions, block changes are conveyed from source site to the destination site through the communications medium 802 (e.g., a WAN).

As described above, improved techniques are directed to automatically creating multiple replication sessions 804 in response to a single replication command from a user. Such a command directs creation of a VSP replication session 804(C) to reliably and robustly replicate a file system environment, and further directs creation of standalone file system replication sessions 804(FS1), 804(FS2), . . . to replicate separate user file systems FS1, FS2, . . . . Along these lines, the necessary replication information for creating the replication sessions can be derived in an automated manner from records in a configuration database 170. Accordingly, the user is required to simply enter one replication command regardless of the number of user file systems being replicated and the data storage system topology. As a result, there is little or no opportunity for error, and the work of the user is less tedious and time consuming.

It should be understood that the above-described techniques are suitable for complex topologies such as one-to-many configurations and cascade configurations. For such topologies, a single replication command from the user may establish many replications sessions 804 automatically, e.g., 10, 50, more than 100, etc.

Additionally, it should be understood that the above-described replication techniques are appropriate for synchronous replication, asynchronous replication, snapshots, copy sessions, and so on. Moreover, the above-described replication techniques do not preclude the data storage system 800 from offering the ability to create sessions individually. Rather, such techniques are available to the user when appropriate and may be used in combination with conventional approaches.

Furthermore, the above-described replication command was described above as being entered by a user by way of example only. In other arrangements, the replication command is can be called automatically, e.g., via a script, from a program as part of an application programming interface (API), and so on.

Additionally, it should be understood that data within a VSP configuration file system of a VSP on the source side may be overwritten at session failover time with data from a VSP configuration file system of a VSP on the destination side. Such an operation may occur, for instance, when the network configuration on the destination side was not compatible with that of the source side and had to be modified.

VSP Mobility

Figure 9:
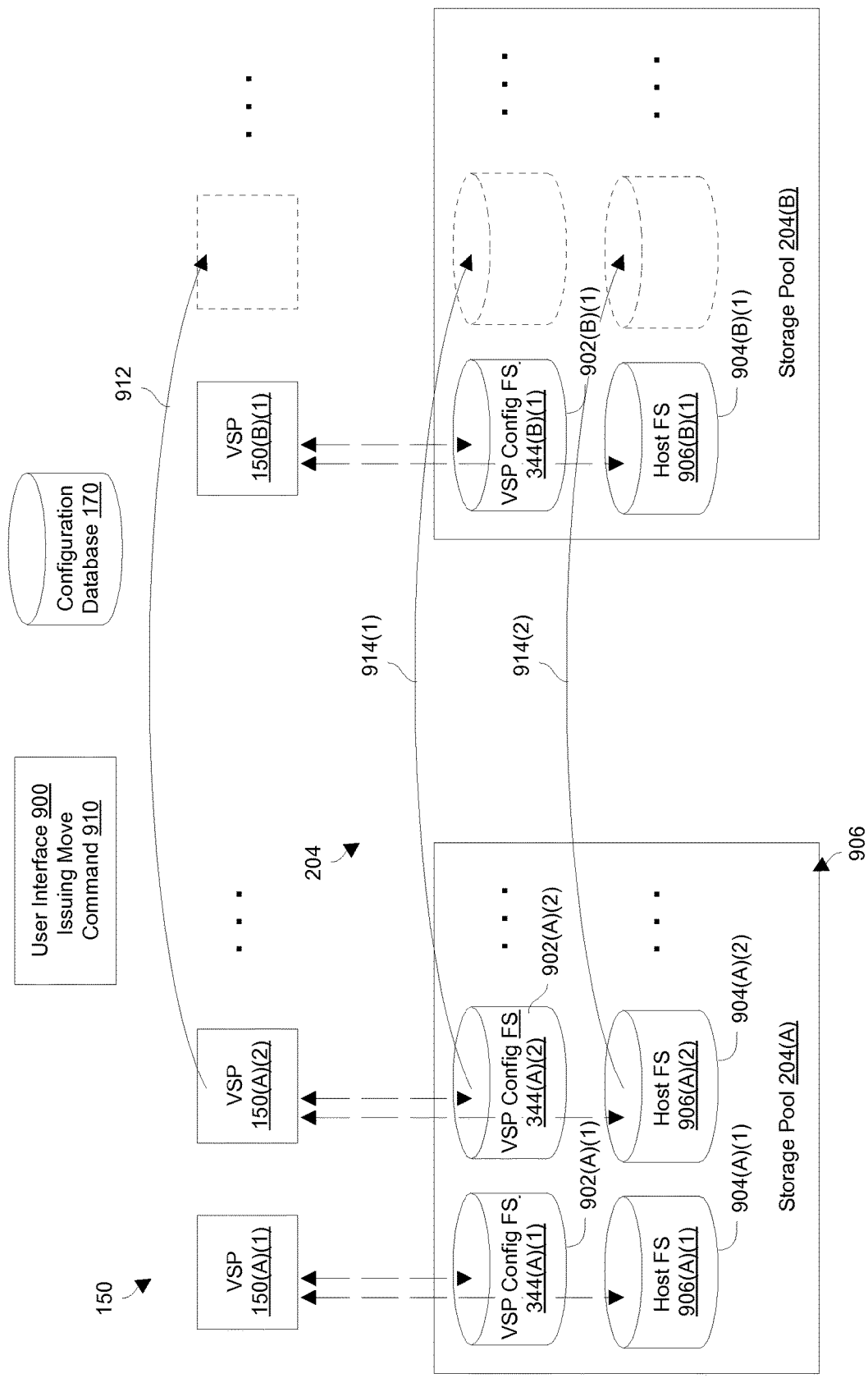
FIG. 9 is a block diagram illustrating, at a first time, a VSP mobility example among two storage pools using replication.
Figure 10:
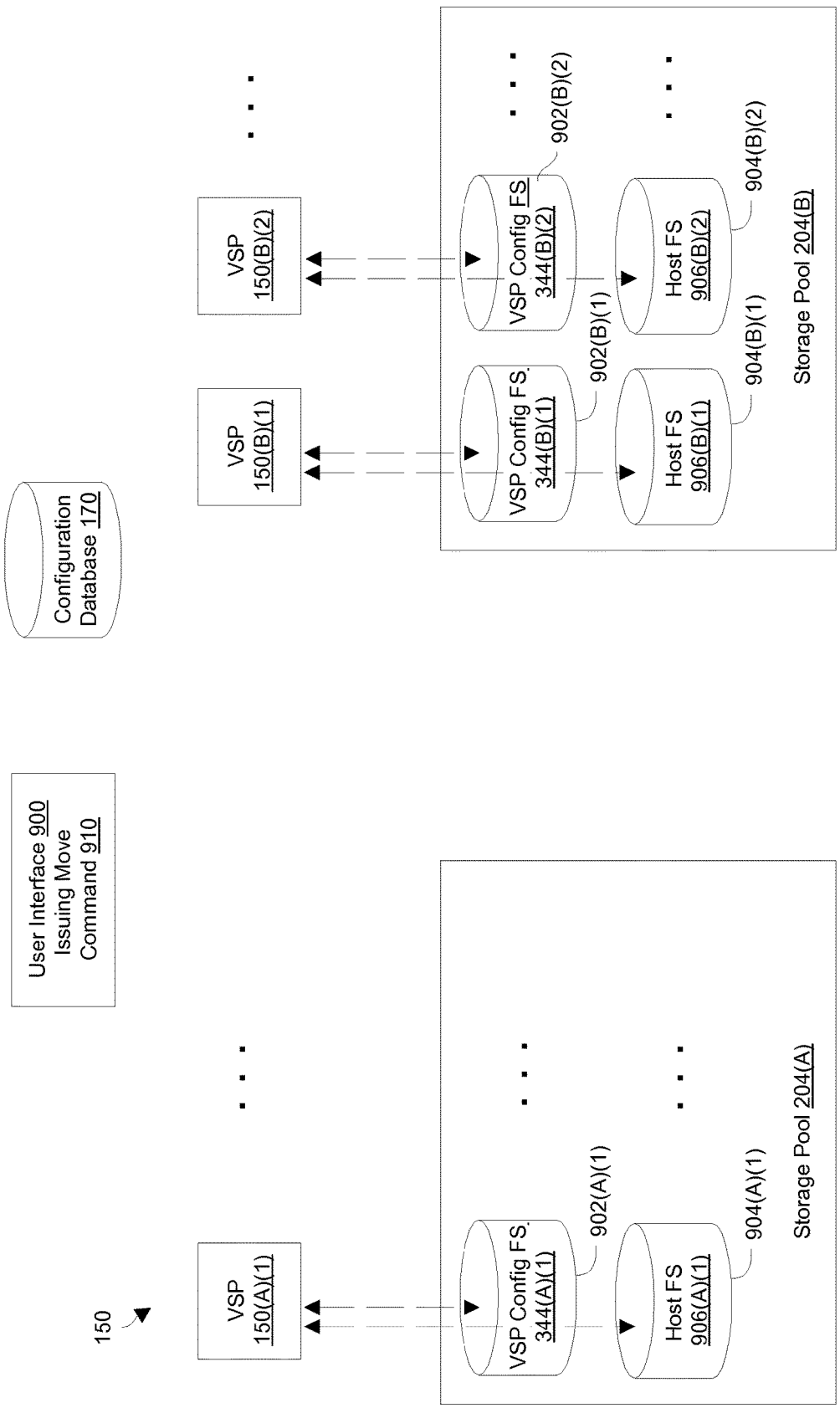
FIG. 10 is a block diagram illustrating, at a second time after the first time, the VSP mobility example among the two storage pools using replication.

FIGS. 9 and 10 illustrate VSP mobility among two storage pools 204(A), 204(B) by way of example (also see FIG. 2). FIG. 9 shows VSPs 150 at a first operating time, T1. FIG. 10 shows VSPs 150 at a second operating time, T2, after the first operating time, T1.

As shown in FIGS. 9 and 10, there are two storage pools 204(A), 204(B), a user interface 900, and a configuration database 170. Each storage pool 204 is formed from a different set of storage units. That is, storage pool 204(A) is formed from a first set of storage units. Additionally, storage pool 204(B) is formed from a second set of storage units that is mutually exclusive with respect to the first set of storage units.

As shown in FIG. 9, the storage pool 204(A) provides storage for VSPs 150(A)(1), 150(A)(2). In particular, a lower-deck file 902(A)(1) contains a VSP configuration file system 344(A)(1) which defines a personality for the VSP 150(A)(1) (also see FIG. 3). Similarly, another lower-deck file 902(A)(2) contains another VSP configuration file system 344(A)(2) which defines a personality for the VSP 150(A)(2).

Additionally and as shown in FIG. 9, a lower-deck file 904(A)(1) contains a host file system 906(A)(1) for use by a host. Similarly, another lower-deck file 904(A)(2) contains another host file system 906(A)(2) for use by a host. Recall that the VSP configuration file systems 344 and host file systems 906 are mounted to the respective root file systems (or root structures) of the VSPs 150 (also see FIG. 3).

Furthermore and as shown in FIG. 9, the storage pool 204(B) provides storage for a VSP 150(B)(1). In particular, a lower-deck file 902(B)(1) contains a VSP configuration file system 344(B)(1) which defines a personality for the VSP 150(B)(1), and a lower-deck file 904(B)(1) contains a host file system 906(B)(1) for use by a host. Again, the VSP configuration file system 344(B)(1) and the host file system 906(B)(1) are mounted to the root file system of the VSP 150(B)(1).

During operating time T1, it should be understood that the processing circuitry of the data storage apparatus 116 processes host input/output (I/O) requests directed to the host file system 906(A)(2) using the VSP 150(A)(2). Now, suppose that a user (e.g., a data storage administrator) wishes to move the VSP 150(A)(2) from the storage pool 204(A) to the storage pool 204(B). Along these lines, the user may have recently added new storage to the storage pool 204(B). Alternatively, the user may have recently deleted a significant amount of data from storage pool 204(B) thus enabling a significant amount of unused slices to be reclaimed for reuse. Other situations may exist which give rise to the user wishing to move the VSP 150(A)(2) as well.

To move the VSP 150(A)(2) from the storage pool 204(A) to the storage pool 204(B), the user issues a move command 910. In particular, the user enters the move command into the user interface 900, e.g., a command line interface or GUI of the data storage apparatus 116, also see FIG. 1. A suitable syntax may be as follows:

$ nas_move-source poolA_VSP-destination poolB where "nas_move" is the specific instruction name, "-source src_VSP" is an option identifying the source VSP ("poolA_VSP"), and "-destination poolB" is an option identifying a destination. A variety of destination types are suitable for use such as simply another storage pool location (as shown above), a combination of destination VSP pool and a destination VSP name, another physical storage processor 120, a new data storage apparatus 116, and so on. Furthermore, other options can be included such as an option that identifies a particular pre-established interconnect by name, another option that specifies a maximum time in which the VSPs can be out of sync during movement (e.g., 30 seconds, one minute, etc.), and so on.

In response to the move command 910, the processing circuitry of the data storage apparatus 116 effectively moves the VSP 150(A)(2) from storage pool 204(A) to storage pool 204(B). In particular, the processing circuitry accesses the records 400 of the configuration database 170 (also see FIG. 4) to identify the VSP root file system and to identify which file systems are mounted to the VSP root file system.

The processing circuitry then effectuates VSP mobility using replication (illustrated by the arrow 912 in FIG. 9). In particular, a new root file system is created for a new VSP 150. Additionally, replication sessions 914(1), 914(2) are created to respectively replicate the VSP configuration file system 344(A)(2) contained in the lower-deck file 902(A)(2) and the host file system 906(A)(2) contained in the lower-deck file 904(A)(2) to the storage pool 204(B).

Once the file systems are fully replicated, the processing circuitry terminates the replication sessions 914(1), 914(2), and activates (or operates) using the new VSP. Such activity may involve deleting replication sessions 914(1), 914(2), and updating the configuration database 170 to delete the source VSP 150(A)(2) and to indicate that the replicated file systems are now mounted to a new VSP 150. Accordingly, the user perceives a source VSP as having moved from the storage pool 204(A) to the storage pool 204(B).

FIG. 10 shows the VSP situation following VSP migration at operating time T2 following operating time T1. In particular, a new VSP 150(B)(2) now exists in place of VSP 150(A)(2), and host I/O requests are now directed to the host file system 906(B)(2) (i.e., a replica of the host file system 906(A)(2) so there is no data lost) using the VSP 150(B)(2). That is, a new lower-deck file 902(B)(2) residing in the storage pool 204(B) contains the replicated VSP configuration file system 344(A)(2) which is the VSP configuration file system 344(B)(2). Likewise, another new lower-deck file 904(B)(2) residing in the storage pool 204(B) contains the replicated host file system 906(A)(2) which is host file system 906(B)(2). As a result, hosts now have access to the host file system 906(B)(2) from the storage pool 204(B).

It should be understood that the destination storage pool 204 for a VSP 150 may be the same data storage apparatus 116, or a different data storage apparatus 116. Additionally, the physical storage processor 120 that owns the destination VSP 150 may be the same physical storage processor 120 that owned the source VSP, a different physical storage processor 120 of the same data storage apparatus 116, or a physical storage processor 120 of another data storage apparatus 116. Accordingly, VSP mobility provides significant flexibility for managing storage.

FIG. 11 shows a flowchart of a procedure 950 which is performed by a data storage apparatus 116 to achieve VSP mobility. At 952, the data storage apparatus 116 receives VSP move command 910 from a user. The VSP move command 910 specifies a source VSP and a destination.

At 954, in response to the VSP move command, the data storage apparatus 116 identifies multiple source data objects which are configured to store data from the context of the source VSP, the multiple source data objects residing in a source storage pool. In particular, the data storage apparatus 116 identifies from records 400 in the configuration database 170 the file systems contained by lower-deck files residing in the source storage pool (also see FIG. 9).

At 956, after the multiple source data objects are identified, the data storage apparatus transforms the multiple source data objects into multiple destination data objects which are configured to store data from the context of a destination VSP at the destination, the multiple destination data objects residing in a destination storage pool which is different from the source storage pool (also see the replication sessions 914(1), 914(2) in FIG. 9, and the resulting operating situation in FIG. 10).

As described above, improved techniques are directed providing mobility to VSPs 150 which define operating environments for file systems accessed by host applications. Such mobility may involve effectively moving VSPs 150 to different storage pools 204 and thus improving flexibility and storage utilization. For example, a VSP 150 is capable of effectively being moved from one storage pool 204(A) to another storage pool 204(B) (see FIGS. 9 and 10) to take advantage of storage abundance opportunities. Such operation is even capable of providing a perception that a VSP 150 has migrated from a first physical storage processor 120 to a second physical storage processor 120.

While various embodiments of the present disclosure have been particularly shown and described, it will be understood by those skilled in the art that various changes in form and details may be made therein without departing from the spirit and scope of the present disclosure as defined by the appended claims.

For example, it should be understood that VSP mobility was described above as utilizing replication as a transport mechanism by way of example only. In other arrangements, a different transport mechanism is used or included in combination with replication. In a particular arrangement, a transport mechanism such as IMT (In-band Migration Tool) is utilized to translate files systems from one format to another (e.g., from UFS32 to UFS 64) as the file systems are copied to a new destination.

Additionally, the source VSP 150 was described a being removed, and the replication sessions 914(1), 914(2) were described above as being deleted by way of example only. In some arrangements, it may be worthwhile to leave the source VSP 150 in place and/or reverse the replication sessions 914(1), 914(2), e.g., for failover in the reverse direction. Other non-deletion activities are suitable as well.

Furthermore, the above-described VSP move command 910 was described above as being entered by a user by way of example only. In other arrangements, the VSP move command 910 is can be called automatically, e.g., via a script, from a program as part of an application programming interface (API), and so on.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not. Those skilled in the art will therefore understand that various changes in form and detail may be made to the embodiments disclosed herein without departing from the scope of the disclosure. Such modifications and enhancements are intended to belong to various embodiments of the disclosure.

What is claimed is:

1. A method of providing mobility to virtual storage processors (VSPs), the method comprising:
   operating a source VSP on a physical storage processor, the physical storage processor having a first network address, the source VSP having a second network address different from the first network address and providing host access to multiple source data objects via the second network address;
   receiving, by processing circuitry, a VSP move command from a user, the VSP move command specifying the source VSP and a destination;
   identifying, by the processing circuitry and in response to the VSP move command, the multiple source data objects which are configured to store data from the context of the source VSP, the multiple source data objects residing in a source storage pool; and
   after the multiple source data objects are identified, (i) transforming the multiple source data objects into multiple destination data objects which are configured to store data from the context of a destination VSP at the destination, the multiple destination data objects residing in a destination storage pool which is different from the source storage pool, and (ii) providing host access to the multiple source data objects, residing in the destination storage pool, via the second network address,
   wherein the physical storage processor on which the source VSP operated is a first physical storage processor, wherein the destination VSP resides on a second physical storage processor having a third network address, and wherein the third network address is different from the first network address and the second network address.

2. A method as in claim 1 wherein transforming the multiple source data objects into the multiple destination data objects includes:
   creating a set of replication sessions to replicate the multiple source data objects as the multiple destination data objects.

3. A method as in claim 2 wherein a particular source data object contains a VSP configuration file system having VSP configuration files which store VSP configuration data; and wherein creating the set of replication sessions includes:
   establishing a VSP configuration file system replication session to replicate the VSP configuration file system to the destination VSP.

4. A method as in claim 3 wherein a set of source data objects contains a set of user files systems having user files which store host data; and wherein creating the set of replication sessions further includes:
   establishing a set of user file system replication sessions to replicate the set of user file systems to the destination VSP, each user file system replication session being a standalone session which is independent of the other user file system replication sessions.

5. A method as recited in claim 3, further comprising storing the second network address and network settings for a network server in the VSP configuration file system of the source VSP,
   wherein establishing the VSP configuration file system replication session to replicate the VSP configuration file system to the destination VSP replicates the second network address and network settings to the destination VSP, and
   wherein providing host access to the multiple source data objects via the second network address includes operating the network server at the destination using the second network address.

6. A method as in claim 2 wherein transforming the multiple source data objects into the multiple destination data objects further includes:
   terminating the set of replication sessions and activating the destination VSP.

7. A method as in claim 6 wherein terminating the set of replication sessions and activating the destination VSP includes:

deleting the set of replication sessions, configuring the destination VSP to access the multiple destination data objects, and deleting the source VSP.

8. A method as in claim 7 wherein a configuration database holds multiple VSP records corresponding to multiple VSPs; and wherein deleting the set of replication sessions, configuring the destination VSP to access the multiple destination data objects, and deleting the source VSP includes:
updating the configuration database to indicate that the destination VSP is defining an operating environment in place of the source VSP.

9. A method as in claim 1, further comprising:
prior to receiving the VSP move command, processing host input/output (I/O) requests directed to a particular user file system using the source VSP.

10. A method as in claim 9, further comprising:
after transforming the multiple source data objects into the multiple destination data objects, processing additional host I/O requests directed to the particular user file system using the destination VSP.

11. A method as in claim 10 wherein processing the additional host I/O requests directed to the particular user file system using the destination VSP includes:
providing, to the user, a perception that the source VSP has migrated from the first physical storage processor to the second physical storage processor.

12. A method as recited in claim 1, wherein the physical storage processor operates multiple VSPs, wherein each VSP operating on the physical storage processor has its own namespace independent of the namespace of other VSPs running on the physical storage processor, and wherein the multiple VSPs running on the physical storage processor all share a common IO stack within the physical storage processor.

13. A method as recited in claim 1, wherein the physical storage processor operates multiple VSPs, wherein each VSP operating on the physical storage processor has its own network address and its own namespace independent of the namespace of other VSPs running on the physical storage processor, and wherein the namespace of each VSP is host accessible via the respective network address of that VSP.

14. A method as recited in claim 13, wherein the physical storage processor has its own namespace independent of the namespace of any of the multiple VSPs, and wherein the namespace of the physical storage processor is host accessible via the first network address.

15. A computer program product having a non-transitory computer readable medium which stores a set of instructions to provide mobility to virtual storage processors (VSPs), the set of instructions, when carried out by computerized circuitry, causing the computerized circuitry to perform a method of:
operating a source VSP on a physical storage processor, the physical storage processor having a first network address, the source VSP having a second network address different from the first network address and providing host access to multiple source data objects via the second network address;
receiving a VSP move command from a user, the VSP move command specifying the source VSP and a destination;
identifying, in response to the VSP move command, the multiple source data objects which are configured to store data from the context of the source VSP, the multiple source data objects residing in a source storage pool; and
after the multiple source data objects are identified, (i) transforming the multiple source data objects into multiple destination data objects which are configured to store data from the context of a destination VSP at the destination, the multiple destination data objects residing in a destination storage pool which is different from the source storage pool, and (ii) providing host access to the multiple source data objects, residing in the destination storage pool, via the second network address,
wherein the physical storage processor on which the source VSP operated is a first physical storage processor, wherein the destination VSP resides on a second physical storage processor having a third network address, and wherein the third network address is different from the first network address and the second network address.

16. A computer program product as in claim 15 wherein transforming the multiple source data objects into the multiple destination data objects includes:
creating a set of replication sessions to replicate the multiple source data objects as the multiple destination data objects.

17. A computer program product as in claim 16 wherein the method further comprises:
prior to receiving the VSP move command, processing host input/output (I/O) requests directed to a particular user file system using the source VSP.

18. A computer program product as in claim 17 wherein the method further comprises:
after transforming the multiple source data objects into the multiple destination data objects, processing additional host I/O requests directed to the particular user file system using the destination VSP.

19. A computer program product as in claim 18 wherein processing the additional host I/O requests directed to the particular user file system using the destination VSP includes:
providing, to the user, a perception that the source VSP has migrated from the first physical storage processor to the second physical storage processor.

20. An electronic apparatus, comprising:
memory; and
control circuitry coupled to the memory, the memory storing instructions which, when carried out by the control circuitry, cause the control circuitry to:
operate a source VSP on a physical storage processor, the physical storage processor having a first network address, the source VSP having a second network address different from the first network address and providing host access to multiple source data objects via the second network address;
receive a VSP move command from a user, the VSP move command specifying the source VSP and a destination,
identify, in response to the VSP move command, the multiple source data objects which are configured to store data from the context of the source VSP, the multiple source data objects residing in a source storage pool, and
after the multiple source data objects are identified, (i) transform the multiple source data objects into multiple destination data objects which are configured to store data from the context of a destination VSP at the destination, the multiple destination data objects residing in a destination storage pool which is different from the source storage pool, and (ii) provide host access to the multiple source data objects, residing in the destination storage pool, via the second network address, wherein the physical storage processor on which the source VSP operated is a first physical storage processor, wherein the destination VSP resides on a second physical storage processor having a third network address, and wherein the third network address is different from the first network address and the second network address.

21. An electronic apparatus as in claim 20 wherein the control circuitry, when transforming the multiple source data objects into the multiple destination data objects, is constructed and arranged to:

create a set of replication sessions to replicate the multiple source data objects as the multiple destination data objects.

22. An electronic apparatus as in claim 21 wherein the instructions, when carried out by the control circuitry, further cause the control circuitry to:

prior to receiving the VSP move command, process host input/output (I/O) requests directed to a particular user file system using the source VSP.

23. An electronic apparatus as in claim 22 wherein the instructions, when carried out by the control circuitry, further cause the control circuitry to:

after transforming the multiple source data objects into the multiple destination data objects, process additional host I/O requests directed to the particular user file system using the destination VSP.

24. An electronic apparatus as in claim 23 wherein the control circuitry, when processing the additional host I/O requests directed to the particular user file system using the destination VSP, is constructed and arranged to:

provide, to the user, a perception that the source VSP has migrated from the first physical storage processor to the second physical storage processor.

* * * * *